United States Patent Office 3,151,969
Patented Oct. 6, 1964

3,151,969
PESTICIDAL DUST COMPOSITION
George D. Stevens, Marinette, Wis., assignor to The Ansul Company, a corporation of Wisconsin
No Drawing. Filed Nov. 15, 1960, Ser. No. 69,252
4 Claims. (Cl. 71—2.3)

This invention relates to agricultural dusts and more particularly to pesticides, i.e., insect repellents, herbicides and fungicides which are applied to a plant in a dry state, and usually in a finely divided form. Agricultural chemicals may be applied as solids (dust), as liquid sprays, as gases (fumigants) and as aerosols. Of these forms, dusts are the most easily and rapidly applied. Speed of application is often important inasmuch as the period for effective control of natural phenomena which affect plant life is frequently as short as five or six days. Moreover, notable savings are effected when dusts are employed, for the reason that they may be applied at high acres per hour rates.

Dusts also are preferred over sprays where weight is a factor, as in application by aircraft. Additionally, dusts permit a combination of ingredients to be employed in dry form which might not be compatible in a solvent. Moreover, even materials which are non-toxic will, when applied as a dust, serve a useful agricultural function, as for example, the repelling of insect and pests, by their mere presence.

The agricultural dusts commercially available today, however, have a tendency to agglomerate, and when agglomerated, to give uneven coverage. More importantly, such dusts are readily removed by wind, rain, and other atmospheric conditions.

It is an object of this invention to provide an agricultural dust which will not cake or agglomerate and which can be easily and completely dispersed.

It is a further object of this invention to provide a dust which will give uniform coverage on plants, even when their surfaces are covered with water droplets.

It is a still further object of this invention to provide a dust with superior adhesion to the surfaces of the plant.

Other objects of the invention will in part be obvious and will in part appear hereinafter.

According to the present invention, it has been discovered that improved agricultural dusts may be prepared by treating them with certain hydrophobic and organophilic materials to render them free flowing and water repellent, and to improve the tenacity with which such dusts adhere to surfaces of growing vegetable material on to which they are applied or sprayed.

The improved agricultural dusts described herein, when applied by spraying, give a relatively even dispersion of powder over the surfaces of leaves and plants, even when the leaf is wet with water droplets. Still more surprising, after about a day, the coated dust adheres so tightly to the leaves and plants that it is necessary to abrade the leaf surface lightly to remove it.

Among the materials discovered to be useful for treating agricultural dusts are water insoluble metallic salts of fatty acids and certain thermosetting silicone polymers.

Typical of the water insoluble salts of fatty acids are the aluminum, barium, zinc, calcium, lead, lithium, magnesium and other well known salts of lauric, myristic, palmitic, stearic and other fatty acids.

These water insoluble metallic salts of fatty acids may be obtained in grades ranging from dense to light and fluffy, any of which will be satisfactory if used in proper quantity. With the dense grade, as much as 3 percent may be necessary while less than 1 percent, or between about 0.1 to 1 percent, of the light grade may be needed. Larger quantities may, of course, be used but the treated product becomes very bulky. For this reason, use of more than 5 percent of the light grades of soaps would ordinarily be avoided. Ordinarily from about 0.1 to 5 percent of the water insoluble metallic salts of fatty acids, based upon the weight of the agricultural dust, may be used.

The silicone materials suitable for treating the agricultural dusts are polysiloxane materials which may be polymerized to a higher thermosetting polymer to produce a coating which forms on the dust particles. These polysiloxane materials are well known in the art and are not a part of this invention. Typically, they have the following general formulae:

(1) $\quad\quad\quad\quad\quad\quad RSiX_3$
(2) $\quad\quad\quad\quad aRSiX_3 + bR_2SiX_2$
(3) $\quad\quad\quad\quad\quad\quad R_xSi_yO_yX$ wherein R = a hydrocarbon as described above. It may be aliphatic (such as alkyl groups including methyl, ethyl, amyl, octadecyl, cyclohexyl, etc., and alkenyl groups including vinyl and allyl) or aromatic (as phenyl, tolyl, etc.) or aralkyl (such as benzyl, etc.). In the simplest case it may be hydrogen.
Si = silicon.
O = oxygen.
X = a reactive group, such as hydrogen, halogen, alkoxyl, hydroxyl, etc.
$x$ and $y$ and $a$ and $b$ are whole numbers.

Any of the polymerizable silicone materials described above may be used to produce the coatings or treating agents for the agricultural dusts. Such materials are widely available commercially, and are sold, for example, by Dow-Corning as DC-1107, DC-1108, Decetex 104, and by Linde Air Products Co. as X-22, Y-1002, and Y-1003. These starting materials are partially hydrolyzed methylhydrogen polysiloxanes, which are predominantly linear in nature but which upon further hydrolysis form cross-linked polysiloxanes. During the further hydrolysis, some of the hydrogen atoms which are attached to the silicon atoms are believed to be displaced and replaced with crosslinking oxygen atoms which connect the silicone atoms of two or more linear polysiloxane chains. Other commercially available materials include those produced by the General Electric Company. For example, General Electric SM-61 is an aqueous emulsion of which the active component is primarily dimethylpolysiloxane which becomes hydrolyzed and crosslinked when heated at about 95° C. General Electric SF-99 is a dimethylpolysiloxane material which is substantially linear in character possessing reactive hydroxyl groups. General Electric SC-87 is a partially hydrolyzed mixture of dimethyldichlorosilane and methyltrichlorosilane, with the former predominating.

The above described silicone compounds are added to the agricultural dusts and then polymerized. In carrying out the polymerization, various catalysts, such as acids, bases, amines, the oxidizing catalysts, such as the peroxides (benzoyl peroxide, etc.) and the "driers," including the metal octoates and naphthenates employed widely by the paint industry, may be used.

Also, if desired, the polymerization may be carried out by heating to temperatures of 100° to 300° for a period of several hours, or by allowing the material to stand at a lower temperature for a much longer period of time. These latter methods, however, have obvious disadvantages.

Especially suitable silicone compounds for use in carrying out the present invention are partially hydrolyzed methyl hydrogen polysiloxanes. Preferably, the polysiloxanes have a hydrogen to silicon ratio between about 0.9 and 1.1 to 1.

It is well known in the art that such methyl hydrogen polysiloxanes, which normally are low viscosity oils, can be polymerized with heat alone, with organo metallic catalysts such as zinc octoate or lead naphthenate, with basic materials such as ethanolamine and with materials having a high surface area such as activated alumina or activated silica gel. However, when used according to the prior art, materials of this type act as catalysts only and do not ordinarily become an essential part of the final polymer.

The manner in which the polymerization (also called curing) is performed influences the physical properties of the final polymer. For example, a polymerization performed over an extended period of time will frequently give a soft, rubbery, sometimes tacky, product, while a more rapid polymerization will yield a hard brittle polymer. When preparing the agricultural dusts of the present invention, a hard brittle coating is most desirable and a soft tacky coating is obviously unsuitable. Although attempts have been made to augment the catalyst action with heat, elevated temperatures frequently have a deleterious effect on the material being coated.

It has been discovered that when the preferred partially hydorlyzed methyl hydrogen polysiloxanes having a hydrogen to silicon ratio between about 0.9 and about 1.1 to 1 are used, these may be polymerized by certain alkyl compounds having terminal amino groups, as is brought out in copending patent application Serial No. 17,253, filed March 24, 1960, of which this application is a continuation-in-part. The reactant preferably contains two or more reactant amino groups, at least one of which is a primary amino group. The amino groups of these reactants are preferably attached to aliphatic carbon atoms. Typical examples of suitable amines include ethylene diamine, propylene diamine, N-methyl bis (amino propyl) amine, 1,6-diamino-n-hexane (hexamethylene), and polyethylene polyamines, such as diethylene triamine, triethylene tetramine, etc.

It has been discovered that when a partially hydrolyzed methyl hydrogen polysiloxane having a hydrogen to silicon ratio between about 0.9 and about 1.1 to 1 is reacted with an amine of the type described, a substantial quantity of the amine is retained in the final siloxane polymer. The reaction rate varies somewhat with the particular silicone and amine but is extremely rapid, even at room temperature, often producing a solid polymer in a matter of minutes. Water may be present during the reaction, but its presence does not appear to be essential.

Dow-Corning 1107 is illustrative of commercially available silicones which may be polymerized in this manner. It is described as a linear methyl hydrogen polysiloxane of 50 to 60 units. Average molecular weight is 3000 to 5000. About nine-tenths of the silicon molecules have hydrogen attached. It is believed to have the following formula:

It is possible to effect a very rapid cure of such silicones by contacting them with the amine reactants described above at room temperature.

The reaction appears to go in two steps, a very rapid first reaction in which a crosslinking occurs as the primary amine groups react with the silicone chain, and a second, slower reaction in which curing takes place due to the alkaline nature of the amine molecule with or without the help of the oxygen of the air, or possibly because of its dehydrating effect.

There are many ways in which triethylene tetramine, for example, might combine with the siloxane in a copolymer molecule, one of which is shown below:

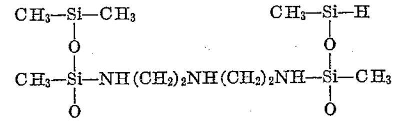

A molecule of hydrogen would then be released at such crosslinking site (one H atom from the amine and one from the silicone).

Although applicant does not intend to be limited to the mechanism of the reaction described, it is believed to be the probable description of the chemical process involved.

The quantity of the silicone compound added to the agricultural dusts may vary widely. Significant improvement in properties was apparent when as little as 0.1 percent by weight had been added. The upper limit is, of course, determined by economics, there being no need to use more than necessary to impart the desirable properties. A dust containing 5 percent of polymerized silicone was entirely satisfactory.

The agricultural dusts, in addition to the active ingredient, may comprise inert materials, such as fillers and aggregates to lend bulk to the dusts. Such inert materials also serve as carriers for the active ingredient or ingredients when their ordinary state is gaseous or liquid. Among such inert materials conventionally used may be mentioned talc, pyrophyllite, various clays, fuller's earth, and like water-insoluble conditioning materials.

Unexpectedly, the active ingredients of the agricultural dusts produced according to the present invention retain their activity as pesticides, i.e., insecticides, herbicides, and so forth, in spite of the fact that they are highly resistant to water.

As illustrative embodiments of the manner in which the invention may be practiced, the following examples are presented:

*Example 1*

A typical commercial floral pesticide dust had the following ingredients, the percentages indicated being by weights:

| | Percent |
|---|---|
| DDT | 3.0 |
| Lindane (gamma isomer of benzene hexachloride) | 1.0 |
| Zineb (zinc ethylenebisthiocarbamate) | 3.9 |
| 2-(p-tert-butylphenoxy) isopropyl 2-chloroethyl sulfate (Aramite) | 1.5 |
| Inert | 90.6 |

When first purchased, this dust flowed quite readily from dusting equipment, but even under nearly ideal conditions, small lumps were noted. When this dust was applied to dry leaves, a coating was obtained, but this was easily removed by sprinkling, rain, or the action of wind. When this commercial dust was applied to leaves bearing droplets of water, agglomerates formed in each droplet and coverage was extremely spotty. Upon drying, these agglomerates readily detached themselves from the leaves. Application of this commercial product was effective for a week or ten days; less if a rain or a series of heavy dews occurred. Upon storage, this commercial pesticide dust gradually lost its free flowing properties and finally would not flow from a duster at all because of its lumpy and caked condition.

A portion of this dust was coated with a silicone polymer by first adding 0.6 gram of water to 200 grams of dust and milling in a small ball mill for 10 minutes. Two grams of Dow-Corning 1107 silicone fluid were added followed by 1 hour of milling. Dow-Corning 1107 is a partially hydrolyzed methyl hydrogen polysiloxane having a hydrogen to silicon ratio between about 0.9 and about 1.1 to 1. The average molecular weight of this material is 3,000 to 5,000 and about nine-tenths of the silicon molecules have hydrogen attached. A small portion of the powder was removed and mixed separately with about 0.3 gram of triethylene tetramine. This material was returned to the main portion and the whole batch was milled for 1 hour more.

After screening, this sample was stored for a period of about 10 months in a glass jar with a loose fitting cover. A sample of untreated dust was used as a control. The samples were kept in conditions of very high atmospheric humidity and in below freezing temperatures during the winter months, and were likewise subjected to natural cycles of freezing and thawing.

At the end of this storage period, the treated sample flowed freely from a commercial dusting package and showed no lumping or agglomeration, while the control sample would not flow from the duster because of its lumpy, caked condition.

*Example 2*

Another coating treatment was applied to an agricultural dust containing the following ingredients, the percentages indicated being by weight:

| | |
|---|---|
| Rotenone | 0.5 |
| Other cubé extractives | 1.0 |
| Dichloro diphenyl dichloroethane | 3.0 |
| Zineb (zinc ethylenebisthiocarbamate; total Zn as metallic 0.924%) | 6.0 |
| Sulfur | 25.0 |

One pound of this dust was slurried with a solution of 4.5 g. Dow-Corning 1107 Silicone Fluid and 1 g. dihexyl amine in 400 g. methylene chloride. After the methylene chloride solvent had evaporated, the powder was cured in an oven for about 4 hours at 60° C. This powder was extremely water repellent and had excellent flow characteristics.

*Example 3*

The agricultural dust of Example 2 was also treated with a chlorosilane as follows:

General Electric "Dri-Film" SC-87 silicone is a water-white polymeric silicone fluid containing some unhydrolyzed chlorine-silicon bonds. Two grams of this fluid were dissolved in 150 grams of methylene chloride and this solution was added to 200 grams of the commercial dust. The mixture was agitated and the methylene chloride was allowed to evaporate. The treated dust was exposed to atmospheric moisture to complete the hydrolysis of the silicone polymer.

*Example 4*

An agricultural dust of the composition set forth in Example 2 was treated by adding 1 percent by weight of a bulky magnesium stearate and blending in a laboratory mixer for 1 hour. This reduced the bulk of the dust and rendered it free flowing.

When the agricultural dusts prepared according to the above examples were applied to a surface wet with water, they immediately spread out in a thin uniform layer to the limits of the water. This same effect was noted when the powder was applied to a wet plant leaf which resulted in extremely uniform coating of dust as the leaves dried.

The most important advantage of the treated dust was its retention on plant and leaves. This dust, prepared as described in the foregoing examples, because of its organophilic and hydrophobic coating, exhibited a remarkable retention on oily or waxy leaf surfaces. It was not at all unusual for this coating to endure outdoors for at least a month, and frequently the coating lasted for an entire season. In these cases it was only necessary to treat the plant as often as required to protect the new growth as it appeared.

Dusts prepared according to the foregoing examples were applied to rose plants which were wet with rain following a shower. The spreading and uniform covering advantages previously described were noted. On the following day, the rose bushes were sprinkled for about ½ hour with a garden sprinkler, approximating about 1 inch of rainfall. The dust coating was clearly visible still adhering to the leaves following this treatment. Some of the leaves were removed and rinsed under water from a running tap. Even this treatment did not remove the dust unless the leaf surface was rubbed with the fingers.

The agricultural dusts prepared according to the foregoing examples were sprayed on several varieties of roses, hydrangeas, chrysanthemums, and tomato plants. Visual observation indicated much less insect and fungus damage than had been noted in two previous years, in spite of the fact that dusting was about half as frequent. For a period of one month, during which approximately 6 inches of rain were recorded, dust was applied only two times and effective control was achieved.

The teachings of the present invention were equally effective when applied to insect repellent dusts, such as finely divided silica, and have also been used highly successfully with powdered herbicides, such as disodium methanearsonate and cacodylic acid.

*Example 5*

A 400 g. sample of commercial Disomate (analysis: 60.3% disodium methyl arsonate, 28.7% NaCl, 0.6% trivalent As) was coated with 2 g. (0.5% by weight) Dow-Corning 1107 in a jar mill. The sample was milled for 1 hour with a quantity of ½" porcelain balls; then a small portion was removed and mixed separately with about 0.4 g. triethylene tetramine. This portion was then returned to the mill and milled with the main batch for another 30 minutes. The sample was screened to remove the balls and was found to be very free flowing and water repellent.

The invention in its broader aspects is not limited to the specific details shown and described but departures may be made therefrom within the scope of the accompanying claims without departing from the principles of the invention and without sacrificing its chief advantages.

What is claimed:

1. A finely divided, free flowing water resistant agricultural dust capable of being applied to growing vegetable material and capable of forming a water resistant, firmly adherent coating thereon, which comprises an effective amount of finely divided, solid particles of a pesticide coated with between about 0.1 percent and 5 percent by weight of the pesticide, of a polymerized thermosetting silicone compound, the silicone compound being a member selected from the group consisting of compounds corresponding to the formulae $RSiX_3$, $$aRSiX_3 + bR_2SiX_2$$

and $R_xSi_yO_yX$, wherein R is a member selected from the group consisting of hydrogen, aliphatic hydrocarbons having from 1 to 18 carbon atoms and aromatic hydrocarbons, selected from the group consisting of phenyl, tolyl and benzyl, X is a member selected from the reactive group consisting of hydrogen, halogen, and hydroxyl, and $a, b, x$ and $y$ are whole numbers.

2. In a method of applying agricultural dusts to growing vegetable material, the improvement which comprises applying to the growing vegetable material finely divided, solid particles of said dust, containing an effective amount of a pesticide coated with between about 0.1 and 5 percent by weight, based upon the weight of the pesticide, of a polymerized thermosetting silicone compound, the silicone compound being a member selected from the group consisting of compounds corresponding to the formulae $RSiX_3$, $aRSiX_3 + bR_2SiX_2$ and $R_xSi_yO_yX$, wherein R is a member selected from the group consisting of hydrogen, aliphatic hydrocarbons having from 1 to 18 carbon atoms and aromatic hydrocarbons selected from the group consisting of phenyl, tolyl and benzyl, X is a member selected from the reactive group consisting of hydrogen, halogen, and hydroxyl, and $a$, $b$, $x$ and $y$ are whole numbers, to form a uniform, firmly adherent, water resistant coating of the particles on surfaces of the vegetable material.

3. A finely divided, free flowing, water resistent agricultural dust capable of being applied to growing vegetable material and capable of forming a water resistent, firmly adherent coating thereon, comprising an effective amount of finely divided, solid particles of a pesticide coated with between about 0.1 and 5 percent by weight, based on the weight of the pesticide, of a co-polymer of a partially hydrolyzed methyl hydrogen polysiloxane having a hydrogen to silicone ratio between about 0.9 and 1.1 to 1 and an amino compound which is a member selected from a group consisting of ethylene diamine, propylene diamine, diethylene triamine, triethylene tetramine, N-methyl bis (amino propyl) amine, and 1,6-diamino-n-hexane.

4. In a method of applying agricultural dust to growing vegetable material, the improvement which comprises applying to the growing vegetable material finely divided, solid particles of the dust containing an effective amount of a pesticide coated with between about 0.1 and 5 percent by weight based upon the weight of the pesticide of a hard, brittle co-polymer of a partially hydrolyzed methyl hydrogen polysiloxane having a hydrogen to silicone ratio between about 0.1 to 1.1 to 1 and containing an amino compound which is a member selected from the group consisting of ethylene diamine, propylene diamine, diethylene triamine, triethylene tetramine, N-methyl bis (amino propyl) amine, and 1,6-diamino-n-hexane.

References Cited in the file of this patent

UNITED STATES PATENTS

| | | |
|---|---|---|
| 2,500,770 | Pierce | Mar. 14, 1950 |
| 2,652,385 | Hunter | Sept. 15, 1953 |
| 2,702,747 | Studebaker | Feb. 22, 1955 |
| 2,923,095 | Maginel-Pelonnier | Feb. 2, 1960 |
| 2,956,922 | Garber et al. | Oct. 18, 1960 |